United States Patent
Lord et al.

(10) Patent No.: US 7,434,384 B2
(45) Date of Patent: Oct. 14, 2008

(54) FLUID MIXER WITH AN INTEGRAL FLUID CAPTURE DUCTS FORMING AUXILIARY SECONDARY CHUTES AT THE DISCHARGE END OF SAID DUCTS

(75) Inventors: Wesley K. Lord, Glastonbury, CT (US); Steven H. Zysman, Hebron, CT (US); Matthew J. Howlett, North Haven, CT (US)

(73) Assignee: United Technologies Corporation, Hartford, CT (US)

( * ) Notice: Subject to any disclaimer, the term of this patent is extended or adjusted under 35 U.S.C. 154(b) by 571 days.

(21) Appl. No.: 10/973,103

(22) Filed: Oct. 25, 2004

(65) Prior Publication Data

US 2008/0190096 A1    Aug. 14, 2008

(51) Int. Cl.
F02K 9/08    (2006.01)
(52) U.S. Cl. ............... 60/262; 181/220; 239/265.11
(58) Field of Classification Search .......... 60/226.1, 60/770, 262, 39.5; 239/265.13, 265.11, 127.3, 239/265.19, 265.27; 181/213, 215, 220
See application file for complete search history.

(56) References Cited

U.S. PATENT DOCUMENTS

| | | | | |
|---|---|---|---|---|
| 3,027,710 | A | | 4/1962 | Maytner ............... 60/35.6 |
| 3,053,340 | A | * | 9/1962 | Kutney ............... 181/220 |
| 3,084,505 | A | * | 4/1963 | Cherchi ............... 239/265.11 |
| 4,072,008 | A | * | 2/1978 | Kenworth et al. ........ 60/266 |
| 4,077,206 | A | * | 3/1978 | Ayyagari ............... 60/262 |
| 4,149,375 | A | | 4/1979 | Wynosky et al. ........ 60/262 |
| 4,302,934 | A | * | 12/1981 | Wynosky et al. ........ 60/262 |
| 4,335,573 | A | * | 6/1982 | Wright ............... 60/762 |
| 4,422,524 | A | * | 12/1983 | Osborn ............... 181/215 |
| 4,487,017 | A | | 12/1984 | Rodgers ............... 60/262 |
| 4,543,784 | A | | 10/1985 | Kirker ............... 60/262 |
| 4,577,462 | A | | 3/1986 | Robertson ............... 60/262 |
| 4,813,230 | A | * | 3/1989 | Braithwaite ............... 60/262 |
| 4,819,425 | A | * | 4/1989 | Farquhar et al. ........ 60/226.1 |
| 5,117,628 | A | * | 6/1992 | Koshoffer ............... 60/226.1 |
| 5,216,879 | A | | 6/1993 | Zysmaan ............... 60/262 |
| 5,265,807 | A | * | 11/1993 | Steckbeck et al. ........ 239/265.11 |
| 5,372,006 | A | * | 12/1994 | Lair ............... 60/226.2 |
| 5,440,875 | A | | 8/1995 | Torkelson et al. ........ 60/226.1 |
| 5,638,675 | A | | 6/1997 | Zysman et al. ........ 60/262 |
| 5,755,092 | A | * | 5/1998 | Dessale et al. ........ 60/262 |
| 5,775,095 | A | * | 7/1998 | Zysman et al. ........ 60/204 |
| 6,016,651 | A | * | 1/2000 | Hammond et al. ........ 60/39.5 |
| 6,276,127 | B1 | * | 8/2001 | Alberti ............... 60/262 |
| 6,487,848 | B2 | | 12/2002 | Zysman et al. ........ 60/262 |
| 6,578,355 | B1 | * | 6/2003 | Mundt ............... 60/262 |
| 6,640,537 | B2 | | 11/2003 | Tse ............... 60/262 |
| 7,017,331 | B2 | * | 3/2006 | Anderson ............... 60/204 |
| 7,114,323 | B2 | * | 10/2006 | Schlinker et al. ........ 60/204 |
| 2003/0115852 | A1 | | 6/2003 | Balzer ............... 60/204 |

* cited by examiner

*Primary Examiner*—William H Rodríguez
(74) *Attorney, Agent, or Firm*—Kenneth C. Baran; Colin L. Cini

(57) ABSTRACT

A fluid mixer for mixing two fluid streams 40, 42 includes a set of main lobes 26 defining alternating primary and secondary main chutes 30, 32, one or more auxiliary lobes 28 intermediate two of the main lobes, and an auxiliary fluid capture duct 62. The auxiliary lobes are defined, at least in part, by the discharge end of the duct. In operation, the duct conveys secondary fluid to secondary chutes 36 defined by the lobes thereby improving the performance of the mixer despite the presence of an obstruction 18 that would otherwise impede thorough mixing of two fluid streams.

8 Claims, 4 Drawing Sheets

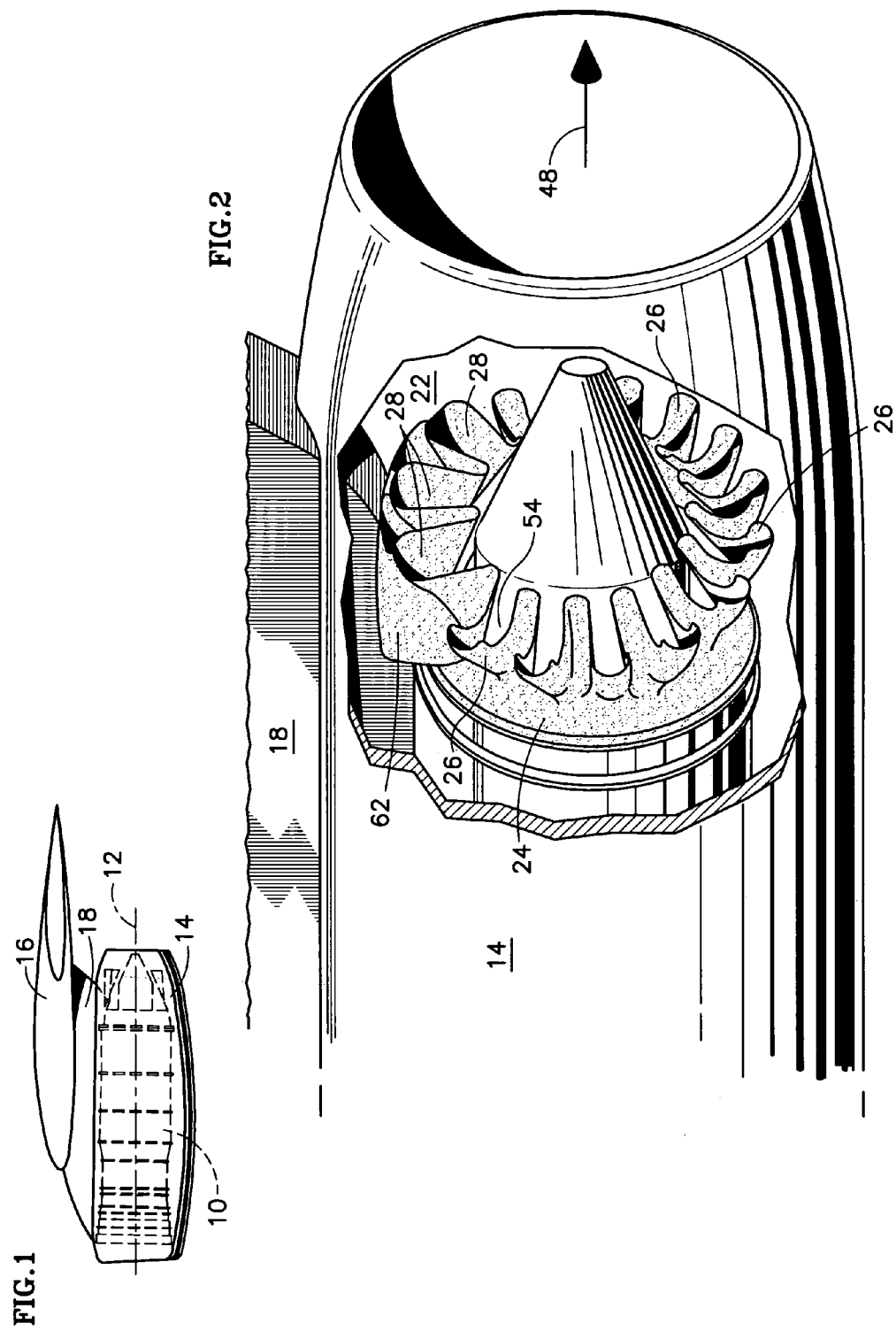

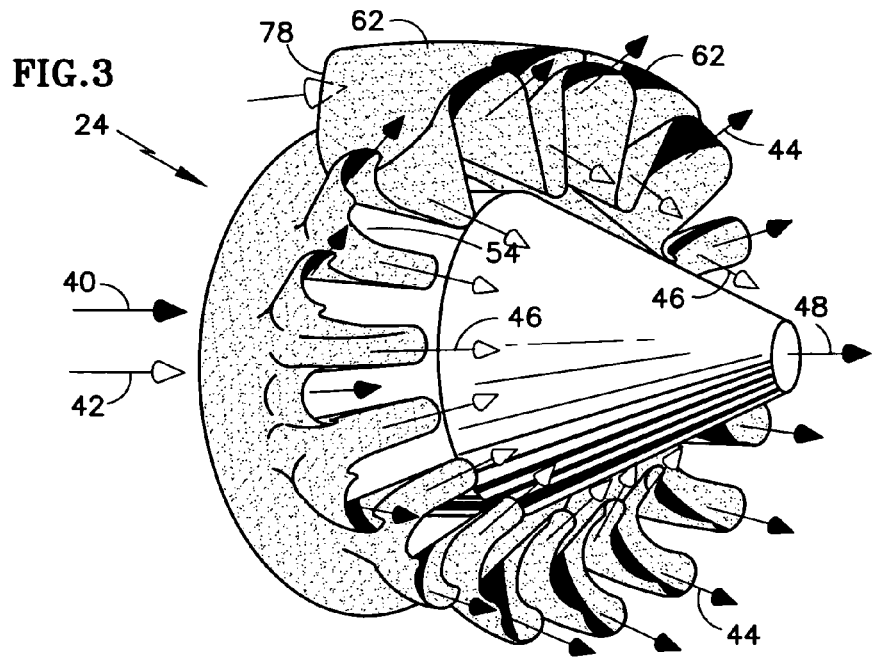
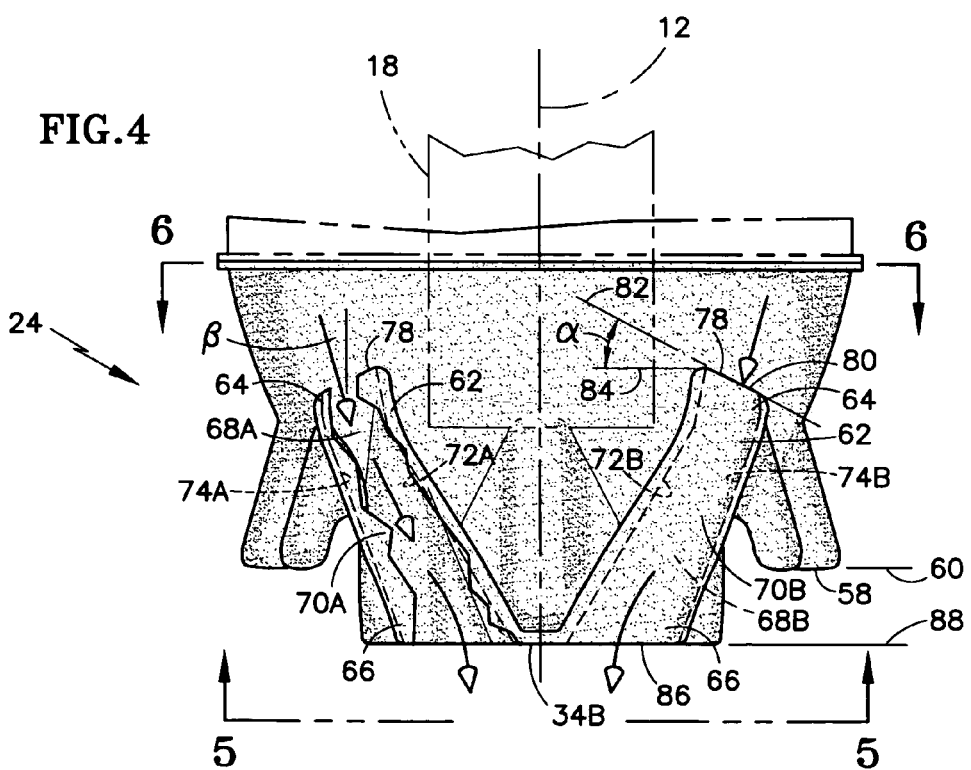

FLUID MIXER WITH AN INTEGRAL FLUID CAPTURE DUCTS FORMING AUXILIARY SECONDARY CHUTES AT THE DISCHARGE END OF SAID DUCTS

TECHNICAL FIELD

This invention relates to fluid mixers of the type useful in mixed flow turbofan gas turbine engines, and particularly to a mixer having an auxiliary duct to capture fluid otherwise blocked by an obstruction.

BACKGROUND OF THE INVENTION

A typical turbofan engine includes a core engine, a fan and a mixed flow exhaust system. The exhaust system includes an exhaust duct whose forward or upstream end circumscribes an internal mixer. A typical mixer features a set of circumferentially distributed lobes that define circumferentially alternating primary and secondary chutes. During operation, the core engine exhausts a primary stream of hot, high velocity combustion products into the primary chutes. Concurrently, the fan exhausts a secondary stream of relatively cool, relatively low velocity bypass air into the secondary chutes. The circumferentially alternating primary and secondary chutes promote thorough, circumferentially uniform mixing of the combustion products with the bypass air, which results in enhanced propulsive efficiency and reduced exhaust noise.

In some airplanes an engine mounting strut and an associated fairing span radially across the secondary air stream. The fairing intrudes axially into the portion of the mixer occupied by the lobes and also has a considerable circumferential width, typically about the same circumferential width as two or three mixer lobes. As a result of this intrusion, the engine manufacturer is unable to provide effective secondary chutes in the vicinity of the fairing. Instead, the mixer has only a single, circumferentially wide lobe and a corresponding wide primary chute in the vicinity of the fairing. The wide primary chute and the absence of secondary chutes compromise the ability of the mixer to uniformly and thoroughly mix the primary and secondary fluid streams. This results in diminished propulsive efficiency and elevated acoustic emissions.

What is needed is a fluid mixer capable of achieving thorough, circumferentially uniform mixing despite the presence of obstructions in the vicinity of the mixer lobes.

SUMMARY OF THE INVENTION

According to one embodiment of the invention, a fluid mixer includes a set of main lobes defining alternating primary and secondary chutes, one or more auxiliary lobes circumferentially between two of the main lobes, and one or more auxiliary fluid capture ducts. The auxiliary lobes are defined, at least in part, by the discharge ends of the ducts. In operation, the ducts convey secondary fluid to secondary chutes defined by the lobes thereby improving the performance of the mixer.

In another embodiment, the forward ends of the auxiliary fluid capture ducts project into a secondary fluid stream to promote effective air capture and total pressure recovery.

The features of these and other embodiments of the invention will become more apparent from the following description of the best mode for carrying out the invention and the accompanying drawings.

BRIEF DESCRIPTION OF THE DRAWINGS

FIG. 1 is a side elevation view of a turbofan gas turbine engine suspended from an airplane wing and circumscribed by a nacelle.

FIG. 2 is an enlarged perspective view of the aft portion of FIG. 1 with the nacelle broken away to expose a fluid mixer including an auxiliary fluid capture duct.

FIG. 3 is a perspective view of the mixer of FIG. 2.

FIG. 4 is a plan view of the mixer of FIG. 3.

BEST MODE FOR CARRYING OUT THE INVENTION

Figure 5:
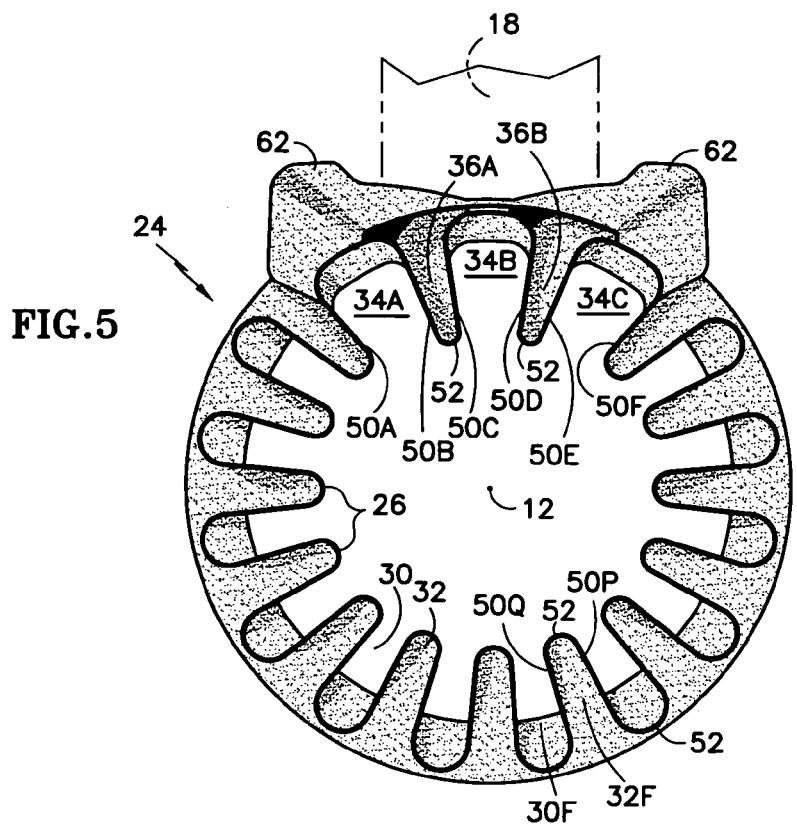
FIG. 5 is a view in the direction 5-5 of FIG. 4, i.e. looking axially upstream.
Figure 6:
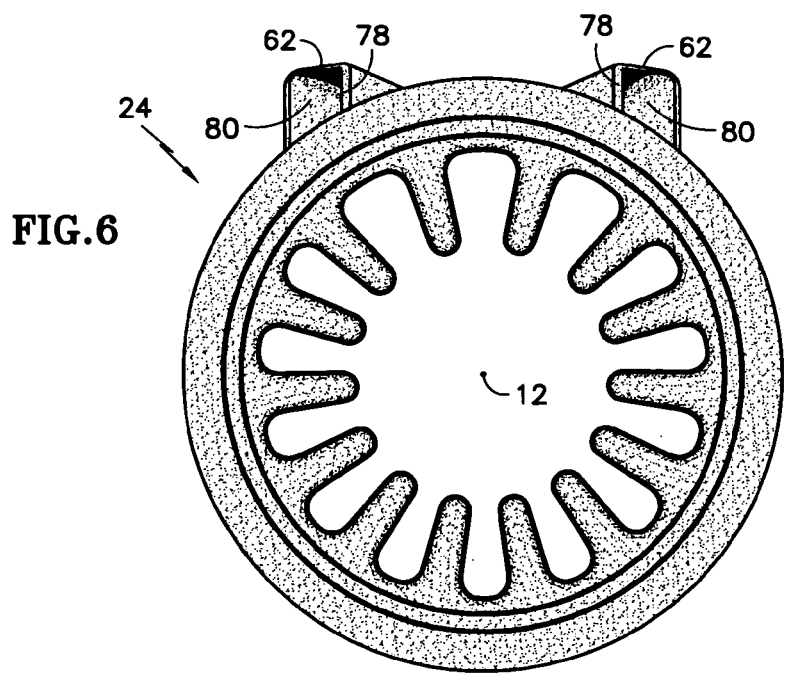
FIG. 6 is a view in the direction 6-6 of FIG. 4, i.e. looking axially downstream.
Figure 7:
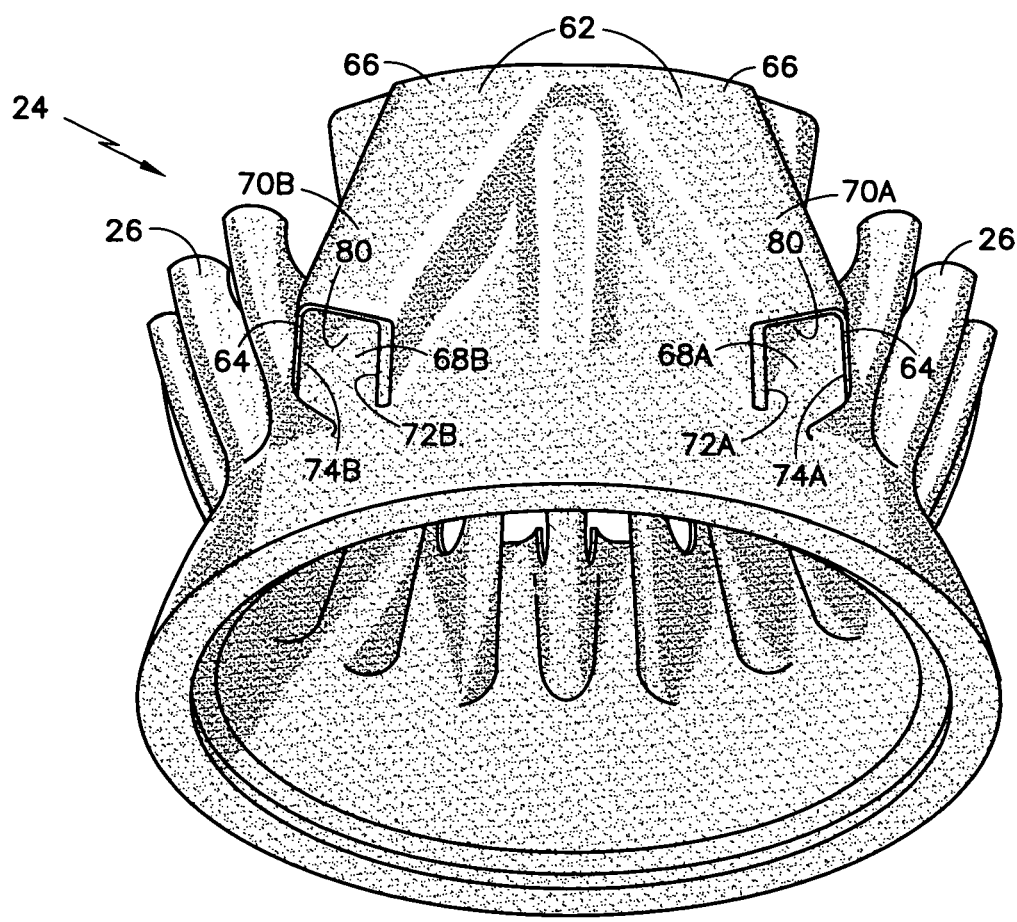
FIG. 7 is a perspective view of the mixer of FIG. 2.

Referring to FIGS. 1-3, an airplane propulsion system includes a turbofan gas turbine engine 10 having an axis 12. An aerodynamically streamlined nacelle 14 circumscribes the engine. Mounting struts, not shown, suspend the engine from an airplane wing 16. A streamlined fairing 18 encloses the mounting struts and other components (e.g. fuel lines) that extend between the engine and the wing.

An exhaust system includes an exhaust duct 22 whose forward or upstream end circumscribes an internal fluid mixer 24. The mixer comprises a set of circumferentially distributed lobes which include several main lobes 26 and three auxiliary lobes 28. As seen best in FIG. 2, the fairing 18 intrudes axially and circumferentially into the vicinity of the lobes. Referring momentarily to FIG. 5, the lobes define circumferentially alternating primary and secondary chutes, such as main primary chutes 30, main secondary chutes 32, auxiliary primary chutes 34, specifically 34A, 34B, 34C, and auxiliary secondary chutes 36, specifically 36A, 36B.

During engine operation, the engine exhausts a primary core stream 40 of hot, high velocity combustion gases into the primary chutes and a secondary annular stream 42 of relatively cool, relatively low velocity bypass air into the secondary chutes. The mixer partially divides each stream 40, 42 into numerous primary and secondary substreams 44, 46 that flow through the circumferentially alternating primary and secondary chutes. The chutes promote thorough mixing of the combustion gases with the bypass air to produce a single, well mixed exhaust stream 48.

Each main lobe 26 comprises a pair of substantially radially extending sidewalls 50 and a gutter 52 bridging circumferentially between the sidewalls. The main lobes define alternating primary and secondary main chutes 30, 32 bounded on three sides by the sidewalls and the gutter and open on a fourth side. The primary and secondary chutes share a common sidewall. For example sidewall 50Q is a sidewall of both primary chute 30F and secondary chute 32F. The sidewalls of the main lobes include scallops 54 (FIGS. 2 and 3) that enhance mixing of the primary and secondary fluid streams. As seen in FIG. 4, the aftmost extremities of the main lobes define a convoluted main lobe trailing edge 58 and an associated main discharge plane 60.

Referring to FIGS. 4-7, and principally to FIG. 4, the mixer also includes a pair of auxiliary fluid capture ducts 62, one each side of the fairing 18. The ducts are integral to the mixer. Each duct has an intake end 64 and a discharge end 66. The intake end of each duct includes a radially inner wall 68A or 68B, a radially outer wall 70A or 70B, an inboard sidewall 72A or 72B and an outboard sidewall 74A or 74B. Duct leading edge 78 defines an approximately rectangular intake opening 80 (FIGS. 6 and 7) and an associated duct intake plane 82 (FIG. 4) for each duct. The intake end of each duct projects radially into the secondary fluid stream 42. Each intake plane is oriented at an offset angle α of between about 0 and 25 degrees relative to a plane 84 perpendicular to the engine axis 12. In the illustrated mixer, the intake plane 82 is oriented at an angle α of about 20 degrees. The orientation angle aligns the duct intake with the local direction of secondary fluid flow as seen best in FIG. 4.

Duct walls 68, 72, 74 transition into and define, at least in part, the sidewalls and gutters of the auxiliary lobes at the discharge end of the duct. The auxiliary lobes define primary and secondary auxiliary chutes, 34A-34C and 36A-36B respectively, similar to primary and secondary main chutes 30, 32. For example, duct inboard sidewalls 72A, 72B define both sidewalls 50C, 50D of auxiliary primary chute 34B. These sidewalls 50C, 50D are also the inboard sidewalls of auxiliary secondary chutes 36A, 36B. Duct outboard sidewall 74A and radially inner duct wall 68A gradually blend together along the length of the duct to define the outboard sidewall 50B and the gutter 52 of auxiliary secondary chute 36A. Similarly, duct outboard sidewall 74B and radially inner duct wall 68B gradually blend together along the length of the duct to define the outboard sidewalls 50E and the gutter 52 of auxiliary secondary chute 36B. The sidewalls 50B, 50E also each form one sidewall of auxiliary primary chutes 34A, 34C. The other wall of each chute 34A, 34C is formed by sidewalls 50A, 50F respectively.

The aftmost extremity of the auxiliary lobes defines an auxiliary lobe trailing edge 86 and an associated auxiliary discharge plane 88. The auxiliary lobe trailing edge 86 is no further forward than the main lobe trailing edge 58. Optimum mixing occurs when the auxiliary lobe trailing edge axially coincides with the main lobe trailing edge. However in the illustrated mixer the auxiliary lobe trailing edge is aft of the main lobe trailing edge so that fluid flowing through each duct 62 can make a relatively gradual turn from angle β at the duct intake plane 82 to a substantially axial direction at the auxiliary discharge plane 88. The more gradual turn helps to reduce aerodynamic losses and guard against fluid separation from the duct walls.

Each duct converges in area by about 20% from the intake plane to the auxiliary discharge plane. The convergence accelerates the secondary fluid and helps prevent fluid separation from the duct walls.

If additional noise reduction is desired, it may be beneficial to include scallops similar to scallops 54 on in the sidewalls of the auxiliary lobes.

The illustrated mixer includes two ducts, two auxiliary secondary chutes and three auxiliary primary chutes. Each duct conveys fluid to one auxiliary secondary chute. However other arrangements are also possible including those in which each duct conveys secondary fluid to multiple auxiliary secondary chutes.

During engine operation, the fairing 18 obstructs the flow of secondary fluid flow into the region immediately aft of the fairing. As a result, pre-inventive mixers have no secondary chutes in the region of the mixer circumferentially aligned with the fairing. Instead, pre-inventive mixers have only a single, circumferentially wide lobe and a corresponding wide primary chute in the vicinity of the fairing. The wide primary chute and the absence of secondary chutes compromise the effectiveness of the mixer.

By contrast, the ducts 62 of the inventive mixer capture secondary fluid flowing past the flanks of the fairing and convey the fluid to the auxiliary secondary chutes 36. Because the intake end 64 of each duct 62 projects radially into the secondary fluid stream, the intake acts as a ram scoop. The ram scoop captures enough air to completely fill the ducts and the auxiliary secondary chutes and recovers more total pressure than would be the case with a passive duct that relies on a difference between the static pressures at the intake and the exhaust to propel fluid through the duct. Concurrently, a quantity of primary fluid enters the auxiliary primary chutes 34. The presence of the auxiliary primary and secondary chutes improves the fluid mixing in the portion of the mixer circumferentially aligned with the fairing.

Although this invention has been shown and described with reference to a specific embodiment thereof, it will be understood by those skilled in the art that various changes in form and detail may be made without departing from the invention as set forth in the accompanying claims.

We claim:

1. A fluid mixer, comprising:
    a plurality of main lobes defining alternating primary chutes for directing a primary core stream, and secondary chutes for directing a secondary annular stream;
    an auxiliary lobe intermediate two of said main lobes;
    an auxiliary secondary chute disposed on a side of the auxiliary lobe;
    an auxiliary capture duct having an approximately rectangular intake end and a discharge end; and
    wherein the duct blends from the intake end to form the auxiliary secondary chute at the discharge end.

2. The fluid mixer as recited in claim 1, wherein the intake end of the duct projects into the secondary annular stream.

3. The fluid mixer as recited in claim 2, wherein the duct converges in a downstream direction.

4. The fluid mixer as recited in claim 3, wherein the duct converges in a downstream direction about 20%.

5. The fluid mixer as recited in claim 1, wherein the duct intake has an intake plane angle oriented at an offset angle alpha (α) relative to a plane perpendicular to an engine axis.

6. The fluid mixer as recited in claim 5, wherein the offset angle alpha (α) is between 0 and 25 degrees.

7. The fluid mixer as recited in claim 1, wherein two auxiliary capture ducts blend to form two auxiliary secondary chutes disposed on each side of the auxiliary lobe.

8. The fluid mixer as recited in claim 7, wherein the two auxiliary capture ducts are disposed on each side of a fairing.

* * * * *